(12) United States Patent
Imura et al.

(10) Patent No.: US 8,071,258 B2
(45) Date of Patent: Dec. 6, 2011

(54) FUEL CELL

(75) Inventors: Shinichiro Imura, Gunma (JP); Takashi Yasuo, Ashikaga (JP)

(73) Assignee: Sanyo Electric Co., Ltd., Osaka (JP)

( * ) Notice: Subject to any disclaimer, the term of this patent is extended or adjusted under 35 U.S.C. 154(b) by 984 days.

(21) Appl. No.: 11/715,845

(22) Filed: Mar. 9, 2007

(65) Prior Publication Data

US 2007/0218338 A1 Sep. 20, 2007

(30) Foreign Application Priority Data

Mar. 10, 2006 (JP) .................................. 2006-066334

(51) Int. Cl.
*H01M 8/04* (2006.01)
*H01M 2/14* (2006.01)
(52) U.S. Cl. ...................................... 429/515; 429/516
(58) Field of Classification Search .......... 429/507–509, 429/515, 516
See application file for complete search history.

(56) References Cited

U.S. PATENT DOCUMENTS

| | | | | |
|---|---|---|---|---|
| 4,537,840 A | * | 8/1985 | Tsukui et al. | 429/33 |
| 2005/0058879 A1 | * | 3/2005 | Guay | 429/38 |
| 2005/0081924 A1 | * | 4/2005 | Manning et al. | 137/581 |
| 2005/0255348 A1 | * | 11/2005 | Manako et al. | 429/15 |

FOREIGN PATENT DOCUMENTS

JP 2004-39293 2/2004

* cited by examiner

*Primary Examiner* — Jerry A Lorengo
*Assistant Examiner* — Carlos Barcena
(74) *Attorney, Agent, or Firm* — McDermott Will & Emery LLP

(57) ABSTRACT

A fuel cell which can utilize the fuel in its fuel reservoir to the fullest possible extent. The fuel cell includes: an electrolyte layer; a first electrode which is provided on one surface of the electrolyte layer and to which a liquid fuel is supplied; and a second electrode which is provided on the other surface of the electrolyte layer and to which an oxidant is supplied. The fuel cell further includes: a fuel chamber which is provided next to the first electrode and stores the liquid fuel; a fuel reservoir which is provided next to the fuel chamber and stores the liquid fuel to be refilled into the fuel chamber; a selectively permeable unit which is provided between the fuel chamber and the fuel reservoir and is permeable to the liquid fuel; and an osmotic pressure generating source which dissolves in a liquid stored in the fuel chamber and does not permeate the selectively permeable unit.

5 Claims, 4 Drawing Sheets

FUEL CELL

BACKGROUND OF THE INVENTION

1. Field of the Invention

The present invention relates to a fuel cell, and in particular to a fuel cell which runs on a liquid fuel and is capable of making full use of the fuel in a fuel reservoir.

2. Description of the Related Art

Fuel cells are devices for generating electric energy from hydrogen and oxygen, and are capable of providing high power generation efficiency. One of the main features of a fuel cell is that electrical power is generated through direct power generation, which is in contrast to conventional power generation methods where electrical power is generated via thermal or kinetic energy processes. Therefore, in a fuel cell, high efficiency power generation can be expected even in small-scale systems. Furthermore, a fuel cell is considered to be very environmentally friendly as it emits lesser amounts of nitrogen compounds and the like and generates less noise and vibration than conventional power generation methods. Since fuel cells can thus make effective use of the chemical energy of fuel, and have environmentally friendly characteristics, they are expected to serve as the energy supply systems of the 21st century. Fuel cells are attracting considerable attention as promising novel generation systems in a variety of applications ranging from large-scale power generation to small-scale power generation, including space technologies, automobiles, and portable devices. Thus, the technological development of the fuel cell for practical use is well under way.

Above all, polymer electrolyte fuel cells are characterized by lower operating temperatures and higher output densities as compared to the other types of fuel cells. Among various types of polymer electrolyte fuel cells, direct methanol fuel cells (DMFCs) have recently been gaining attention in particular. In DMFCs, an aqueous methanol solution (or pure methanol) serving as the fuel is supplied directly to the anode without any modification so that electrical power is generated through an electrochemical reaction between the aqueous methanol solution and oxygen. During this electrochemical reaction, carbon dioxide is discharged from the anode, and water is produced at the cathode as a reaction product. In comparison to hydrogen, aqueous methanol solution provides higher energy per unit volume, and has a lower risk of explosion or the like and is also suitable for storage. Thus, a DMFC is expected to be employed as a power source for automobiles, portable devices (cellular phones, notebook PCs, PDAs, MP3 players, digital cameras, and electronic dictionaries (books)), and the like.

In conventional fuel cells such as that disclosed in Japanese Patent Laid-Open Publication No. 2004-039293, the aqueous methanol solution to be supplied to the anode is delivered using a fuel supply unit such as a liquid pump. In the case of a so-called passive fuel cell where pumps and other driving sources are omitted as much as possible, however, the main body of the fuel cell has no driving source for delivering the fuel from a replaceable fuel reservoir (such as fuel cartridge) to a fuel chamber. In this instance, the fuel cartridge is removably connected to the fuel cell body. The fuel chamber is arranged next to the anode, and temporarily retains the fuel to be supplied to the anode by the action of natural convection, capillary force, or the like. The problem with this arrangement is that the fuel cartridge must be replaced when the fuel in the fuel cartridge and the fuel in the fuel chamber reach an equal concentration level, or when the fuel must be delivered from the fuel cartridge to the fuel chamber by the application of a spring force, gravity, or a squeezing force or the like imparted by the user.

SUMMARY OF THE INVENTION

The present invention has been developed in view of the foregoing problem, and a general purpose thereof is to provide a fuel cell which runs on a liquid fuel and is capable of making full use of the fuel in a fuel reservoir.

To achieve the foregoing purpose, a fuel cell according to the present invention comprises: an electrolyte layer; a first electrode which is provided on one surface of the electrolyte layer and to which a liquid fuel is supplied; a second electrode which is provided on the other surface of the electrolyte layer and to which an oxidant is supplied; a fuel chamber which is provided next to the first electrode and stores the liquid fuel; a fuel reservoir which is provided next to the fuel chamber and stores the liquid fuel to be refilled into the fuel chamber; a selectively permeable unit which is provided between the fuel chamber and the fuel reservoir and is permeable to the liquid fuel; and an osmotic pressure generating source which dissolves in a liquid stored in the fuel chamber and does not permeate the selectively permeable unit. If an osmotic pressure generating source having large molecules, such as glucose, is dissolved in the fuel-chamber side, and a semipermeable membrane or other member that is selectively permeable to the liquid fuel (such as methanol molecules) is interposed between the fuel chamber and the fuel reservoir, an osmotic pressure occurs between the fuel chamber and the fuel reservoir. This pressure makes it possible to refill the fuel chamber with the liquid fuel from the fuel reservoir. Consequently, the fuel in the fuel reservoir can be utilized to the fullest possible extent even when passive fuel cells and the like that have no driving source are used.

It should be appreciated that in preferred embodiments the fuel reservoir may be removable from the fuel cell. Then, even when the fuel in the fuel reservoir is consumed to a point where it can no longer be supplied into the fuel chamber, it is therefore possible to remove the fuel reservoir from the fuel cell and replace it with a new fuel reservoir.

It is to be noted that any arbitrary combination or rearrangement of the above-described structural components and so forth are all effective as and encompassed by the present embodiments. Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
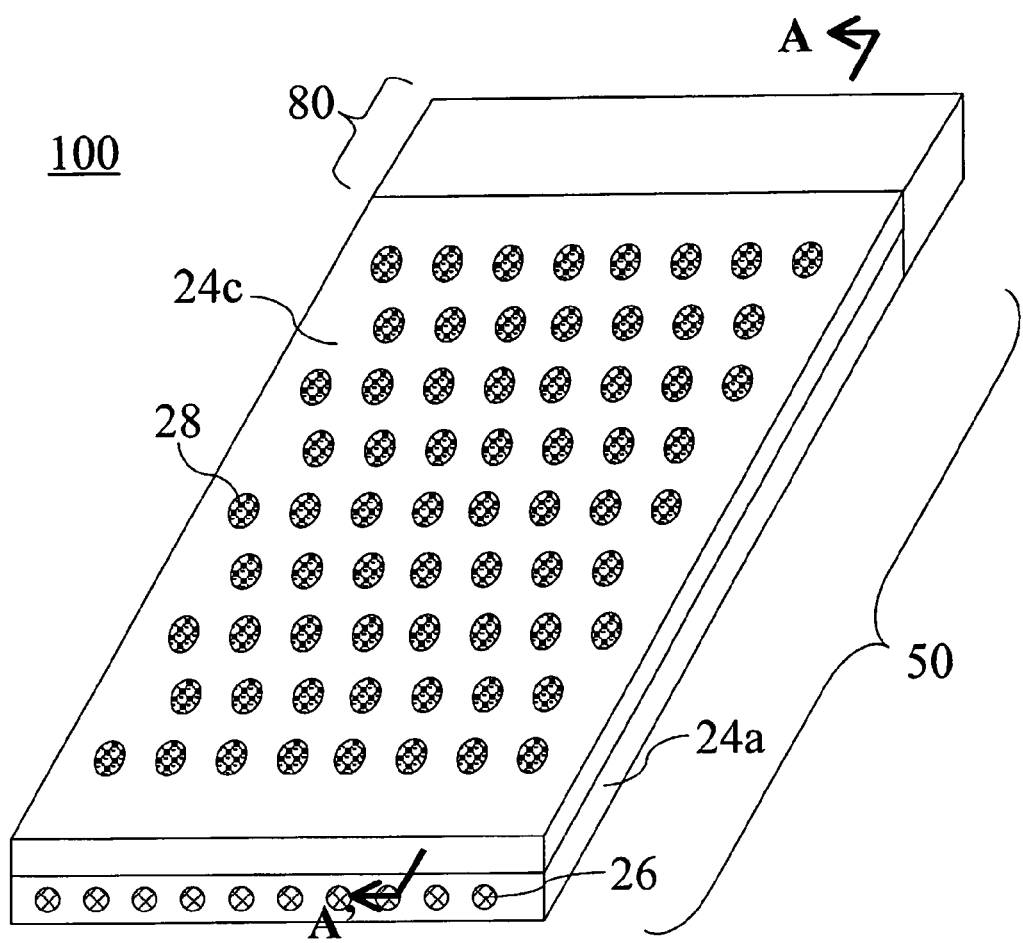
FIG. 1 is a perspective view schematically showing the appearance of a fuel cell according to the embodiment.
Figure 2:
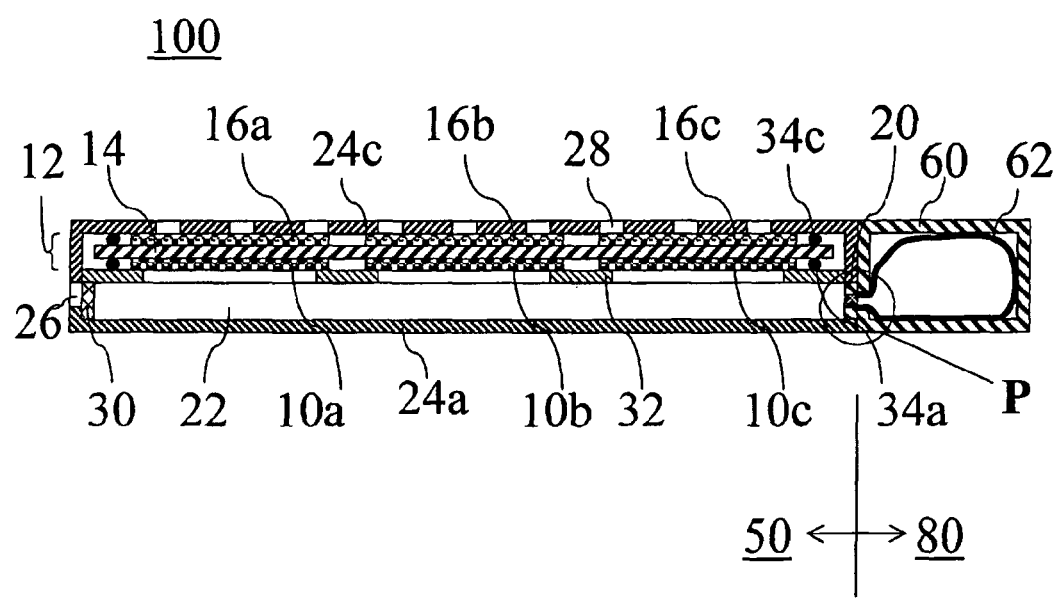
FIG. 2 is a sectional view schematically showing the internal structure of the fuel cell according to the embodiment.

The basic configuration of a fuel cell 100 according to the embodiment will now be described with reference to the drawings. FIG. 1 is a perspective view schematically showing the appearance of the fuel cell 100 according to the embodiment. FIG. 2 is a sectional view schematically showing the internal structure of the fuel cell 100 according to the embodiment as taken along the line A-A' of FIG. 1. In the present embodiment, the fuel 100 is a DMFC in which an aqueous methanol solution or pure methanol (hereinafter, referred to as "methanol fuel") is supplied to its anodes 10. Membrane electrode assemblies (MEAs) 12, or power-generating parts, are formed by sandwiching an electrolyte membrane 14 between the anodes 10 and cathodes 16. As shown in FIG. 2, the fuel cell 100 according to the embodiment has three cells. Referring to FIG. 2, anodes 10a, 10b and 10c, and cathodes 16a, 16c and 16c mark distinction between cells. The term "anodes 10" is a generic reference to the anodes 10a, 10b and 10c, and the term "cathodes 16" is a generic reference to the cathodes 16a, 16b and 16c.

The methanol fuel to be supplied to the anodes 10 is delivered from outside a fuel cell body 50 to a fuel chamber 22 through a methanol fuel supply hole 20. The methanol fuel stored in the fuel chamber 22 is supplied to the anodes 10. The anodes 10 cause a methanol reaction as shown in formula (1) to take place, so that H⁺ move to the cathodes 16 through the electrolyte membrane 14 and electrical power is output.

$$CH_3OH + H_2O \rightarrow CO_2 + 6H^+ + 6e^- \qquad (1)$$

As is evident from formula (1), the anodes 10 produce carbon dioxide as a byproduct of this reaction. Then, a gas-liquid separation filter 30 is placed between the fuel chamber 22 and anode-side product discharge holes 26 formed in an anode-side case 24a of the fuel cell 100.

This gas-liquid separation filter 30 is a flat filter having microscopic holes that selectively allow gaseous components to pass through but not liquid components. Examples of materials suitable for this gas-liquid separation filter 30 are fluorinated synthetic resins that are resistant to methanol (alcohol), including: polychlorotrifluoroethylene, polyfluorovinylidene, polyfluorovinyl, polytetrafluoroethylene (PTFE), tetrafluoroethylene-perfluoroalkylvinylether copolymer (PFA), tetrafluoroethylene-hexafluoropropylene copolymer (FEP), tetrafluoroethylene-ethylene copolymer (E/TFE), polyvinylidene fluoride (PVDF), polychlorotrifluoroethylene (PCTFE), chlorotrifluoroethylene-ethylene copolymer (E/CTFE), perfluoro cyclic polymer, and polyvinyl fluoride (PVF).

Cases 24 (including the anode-side case 24a and cathode-side case 24c) are suitably made of materials that have light weight, high rigidity, and corrosion resistance. Specific examples of the materials include: synthetic resins such as acryl resins, epoxy resins, glass epoxy resins, silicon resins, cellulose, nylon, polyamideimide, polyarylamide, polyaryletherketone, polyimide, polyurethane, polyetherimide, polyetheretherketone, polyetherketoneetherketoneketone, polyetherketoneketone, polyethersulfone, polyethylene, polyethylene glycol, polyethylene terephthalate, polyvinyl chloride, polyoxymethylene, polycarbonate, polyglycolic acid, polydimethylsiloxane, polystyrene, polysulfone, polyvinyl alcohol, polyvinylpyrrolidone, polyphenylene sulfide, polyphthalamide, polybutylene terephthalate, polypropylene, polyvinyl chloride, polytetrafluoroethylene, and rigid polyvinyl chloride; and metals such as aluminum alloys, titanium alloys, and stainless steel. Tempered glass and skeleton resins may also be used. Like the gas-liquid separation filter 30, the cases 24 also have areas that make contact with the methanol fuel. The areas that are to make contact with the methanol fuel are thus particularly preferably made of the foregoing synthetic resins or composite materials formed by covering metals with fluorinated synthetic resins. The reference numeral 32 designates a supporting member which forms the fuel chamber 22 and fastens the MEAs 12. The supporting member 32 is also preferably made of the same material as that of the cases 24 where to make contact with the methanol fuel.

In the present embodiment, the electrolyte membrane 14 of the MEAs 12 is made of Nafion 115 (from DuPont). An anode catalyst paste made of a mixture of Pt—Ru black and 5 wt % of Nafion solution (from DuPont) is applied to one surface of this electrolyte membrane 14 to form the anodes 10. A cathode catalyst paste made of a mixture of Pt black and 5 wt % of Nafion solution (from DuPont) is applied to the other surface to form the cathodes 16. While the electrolyte membrane 14 of the present embodiment is made of Nafion 115, the electrolyte membrane 14 may be made of any electrolyte membrane as long as it is ion-conductive and has a thickness in the range of 50 to 200 μm. In the case of DMFCs that run on a methanol fuel as detailed in the present embodiment, it is even more preferable that the electrolyte membrane 14 is capable of suppressing a so-called cross over phenomenon in which methanol permeates through the electrolyte membrane 14 to reach the cathode side. Moreover, while the anodes 10 and the cathodes 16 are formed on the electrolyte membrane 14, the fabrication method and configuration may be such that the catalyst layers are formed on electrode bases made of carbon paper or the like. Furthermore, the catalysts are not limited to Pt—Ru or other catalysts based on Pt-based particles (such as Pt—Ru black and Pt black) but may be carbon-based materials that carry catalysts, or catalyst-carrying carbons, as long as they have the catalytic function of generating H⁺ from methanol, or generating water from H⁺ and oxygen.

Air is supplied to the cathodes 16 through cathode-side product discharge holes 28. H⁺ that reach the cathodes 16 through the electrolyte membrane 14 and oxygen in the air cause a reaction to produce water, as shown in formula (2).

$$3/2 O_2 + 6H^+ + 6e^- \rightarrow 3H_2O \qquad (2)$$

The inner walls of the cathode-side product discharge holes 28, and the surfaces of the cathode-side case 24c where the cathode-side product discharge holes 28 are formed, are coated with a functional coating material that contains a photocatalyst such as titanium oxide. The product water discharged from the cathodes 16 is prevented from dripping by provision of a large number of small holes. Furthermore, by coating the inner wall with the functional coating material, the product water spreads thinly over the surface of the inner wall without clogging the holes. Thus, the evaporation of the product water is facilitated, and breeding of microorganisms or the like can be prevented. Preferably, this functional coating material contains a metal such as silver, copper, or zinc in order to provide an organic material decomposition function and an antimicrobial function that are activated even when the fuel cell 100 is not irradiated with light that includes photocatalyst-activating wavelengths, as sunlight. Furthermore, when a user of the fuel cell 100 touches the fuel cell 100, organic materials may adhere to the fuel cell 100. When the entire surface of the cases 24 is coated with the functional coating material, any organic materials adhered to the cell can be decomposed. In this manner, a soil resistance function or the antimicrobial function can be imparted to the fuel cell 100.

In order to prevent the methanol fuel from flowing from the anodes 10 to the cathodes 16, O-rings 34 (an anode-side O-ring 34a and a cathode-side O-ring 34c) are placed so as to surround and enclose the plurality of MEAs 12. In this Example, the O-rings 34 are pressed by the cathode-side case 24c and the support member 32 to prevent the methanol fuel from flowing from the anodes 10 to the cathodes 16 and to prevent oxygen from flowing into the anodes 10 as well. Desirably, the O-rings 34 are made of a material having both flexibility and corrosion resistance. Suitable materials include: natural rubber, nitrile rubber, acrylic rubber, urethane rubber, silicon rubber, butadiene rubber, styrene rubber, butyl rubber, ethylene-propylene rubber, fluorine rubber, chloroprene rubber, isobutylene rubber, acrylonitrile rubber, and acrylonitrile-butadiene rubber.

Aside from the foregoing configuration, a porous Teflon™ sheet or the like capable of circulating the air and the water produced at the cathodes 16 is preferably interposed between the cathodes 16 and the cathode-side case 24c so that the cathodes 16 will not be touched by users, although this is not shown in the diagram. Furthermore, the diameters of the cathode-side product discharge holes 28 and the thickness of the cathode-side case 24c where the cathode-side product discharge holes 28 are formed may be adjusted (to increase the thickness dimension of the cathode-side case 24c with respect to the diametric dimension of the cathode-side product discharge holes 28). Such a case design can prevent users from making contact with the cathodes 16 even when they touch the surface of the cathode-side case 24c of the fuel cell 100. Moreover, the areas where the cathode-side product discharge holes 28 are formed may be provided with a covering lid. This makes it possible to prevent the MEAs 12, or the electrode membrane 14 in particular, from drying while the fuel cell 100 is at rest. The entry of dust, bacteria (mold), and other organics into the side of the cathodes 16 can also be avoided. This lid may be formed as a slide lid to save on installation space.

While the present embodiment has dealt with the case where the fuel chamber 22 is a space which is filled with the methanol fuel, a three-dimensional porous body which absorbs the methanol fuel (being a fuel absorber), like a sponge, may be put in the fuel chamber 22. Examples of such a fuel absorber include woven fabrics, unwoven cloths, and felts of fibers made of polyolefins (such as polyethylene and polypropylene), nylon, polyester, rayon, cotton, polyester/rayon, polyester/acryl, rayon/polychlal, and the like. The fuel absorber put in the fuel chamber 22 causes a capillary action, thereby supplying the methanol fuel to the anodes 10 evenly irrespective of the installed position (orientation) of the fuel cell 100. The present embodiment has also dealt with the case where the cases 24 are coated with a functional coating material that contains a photocatalyst. Nevertheless, the antibacterial function at least can be ensured by coating the surfaces of the cases 24 with metals such as silver, copper, and zinc, or by making the cases 24 out of a material that contains metals such as silver, copper, and zinc.

The fuel cell body 50 (fuel chamber 22) of the fuel cell 100 according to the embodiment is supplied with the methanol fuel which is delivered from a fuel cartridge 80, removable from the fuel cell body 50, to the fuel chamber 22 through the methanol fuel supply hole 20. The fuel cartridge 80 is composed of an outer case 60 which maintains a predetermined shape, and a fuel bag 62 which is loaded inside with the methanol fuel and changes its shape depending on the amount of methanol fuel loaded. The outer case 60 is preferably made of a material or materials that have light weight and high rigidity, or are made of the same material as that of the cases 24 of the fuel cell body 50 if taking design into consideration. The fuel bag 62, which stores the methanol fuel inside, is preferably made of a synthetic resin that is highly resistant to methanol (corrosion resistance), and exhibits good plasticity, elasticity, or flexibility. Suitable materials thereof include: acrylic resins, epoxy resins, glass epoxy resins, silicon resins, cellulose, nylon, polyamideimide, polyarylamide, polyaryletherketone, polyimide, polyurethane, polyetherimide, polyetheretherketone, polyetherketoneetherketoneketone, polyetherketoneketone, polyethersulfone, polyethylene, polyethylene glycol, polyethylene terephthalate, polyvinyl chloride, polyoxymethylene, polycarbonate, polyglycolic acid, polydimethylsiloxane, polystyrene, polysulfone, polyvinyl alcohol, polyvinylpyrrolidone, polyphenylene sulfide, polyphthalamide, polybutylene terephthalate, polypropylene, polyvinyl chloride, polytetrafluoroethylene, and rigid polyvinyl chloride.

Figure 3:
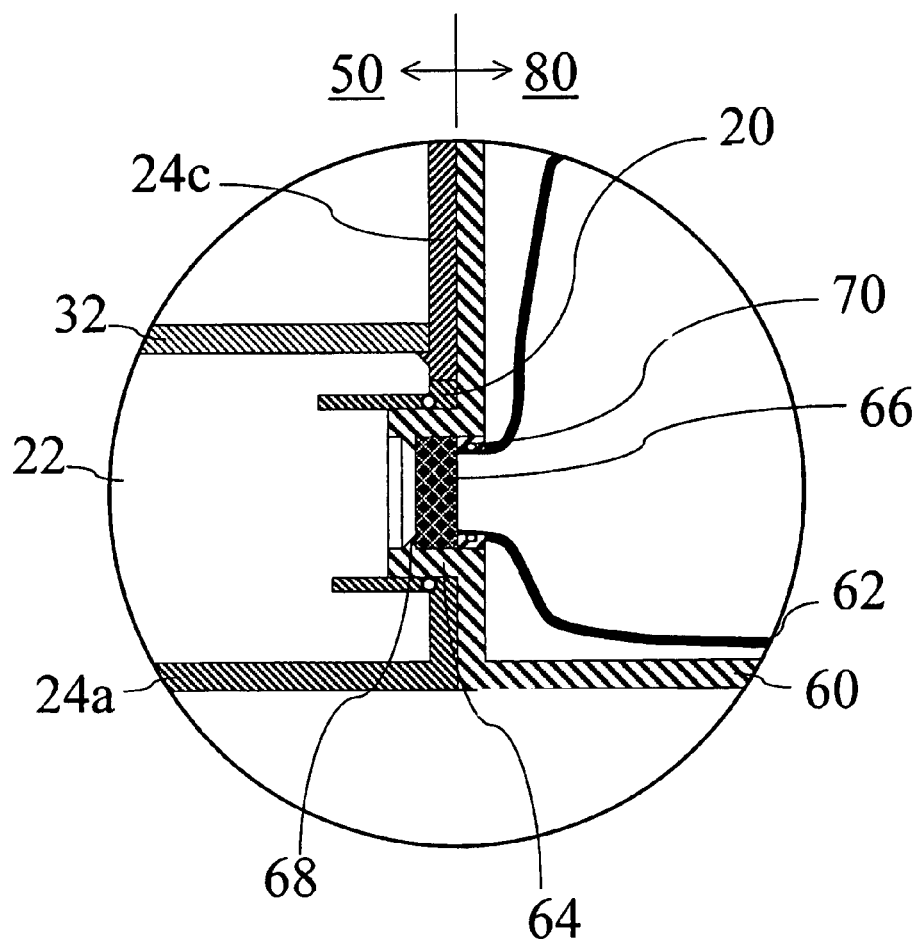
FIG. 3 is an enlarged view schematically showing the connecting structure of the fuel cell according to the embodiment.

FIG. 3 is an enlarged view of the part P shown in FIG. 2, schematically showing the connecting structure between the fuel cell body 50 and the fuel cartridge 80 of the fuel cell 100 according to the embodiment. The anode-side case 24a of the fuel cell body 50 includes the methanol fuel supply hole 20. This methanol supply hole 20 is configured to close when the fuel cartridge 80 is not connected, so that the methanol fuel inside the fuel chamber 22 does not leak out. An insert protrusion 64 of the fuel cartridge 80, to be inserted into the methanol fuel supply hole 20, is tapered in the outer periphery so that it fits into the methanol fuel supply hole 20 (with fitting tolerances in the range of 0 to 20 μm) for easy connection. The methanol fuel supply hole 20 is configured to be opened when pushed on by this insert protrusion 64. The insert protrusion 64 is cylindrical (hollow) in shape, and a semipermeable membrane (serving as the selectively permeable unit) 66 is arranged inside. The semipermeable membrane 66 is supported by a tab 68 and a retaining ring 70. The tab 68 is formed on the inner wall of the insert protrusion 64. The retaining ring 70 fastens the inlet of the fuel bag 62 to the outer case 60 (insert protrusion 64). For the sake of safety, the extremity of the insert protrusion 64 may be sealed with a sticker before the use with the fuel cartridge 80. This sticker shall be removed and the insert protrusion 64 shall be inserted into the methanol fuel supply hole 20 immediately prior to use of the fuel cartridge 80 (before inserting the insert protrusion 64 into the methanol fuel supply hole 20), so as to avoid leakage of any methanol fuel from the fuel cartridge 80.

Since the connecting area between the fuel cell body 50 and the fuel cartridge 80 include a semipermeable membrane 66, the fuel chamber 22 of the fuel cell 100 according to the embodiment is loaded with glucose in advance. This makes it possible to supply the methanol fuel from the fuel bag 62 to the fuel chamber 22 through the semipermeable membrane 66 by means of osmotic pressure. That is, the fuel chamber 22 is prepared to contain methanol (being the hydrogen atom source), glucose (being the osmotic pressure generating source), and water (medium).

Alternatively, the fuel chamber 22 may be prepared to contain glucose (the osmotic pressure generating source) and water (the medium) at the time of shipment of the fuel cell 100. The fuel cartridge 80 is then connected to the fuel cell body 50, whereby methanol in the fuel bag 62 is supplied to the fuel chamber 22 through the semipermeable membrane 66 by osmotic pressure so that the fuel chamber 22 contains methanol (the hydrogen atom source), glucose (the osmotic pressure generating source), and water (the medium). It therefore follows that the fuel cell body 50 (including the fuel chamber 22) is filled with an aqueous glucose solution, and the cathodes 16 will not react with any oxygen that leaks in. Moreover, at the time of shipment of the fuel cell 100, the fuel chamber 22 may be prepared to contain glucose (the osmotic pressure generating source) and methanol (the hydrogen atom source and medium) so that the anode reaction (as detailed in formula (1)) occurs due to water produced at the cathodes 16 that diffuses back from such. In this case, the glucose loaded in the fuel chamber 22 in advance facilitates the back diffusion as the electrolyte membrane 14, being a solid polymer membrane, also exhibits the properties of a semipermeable membrane. Glucose is less soluble in methanol than in an aqueous methanol solution. The fuel chamber 22 may therefore be loaded with glucose to a point where as some of the glucose remains undissolved, so that this remaining glucose dissolves when water produced at the cathodes 16 diffuses back to lower the concentration of the methanol fuel in the fuel chamber 22. This makes it possible to start using the fuel cell body 50 (immediately after purchase) without connecting the fuel cartridge 80 to supply the methanol fuel. When glucose or other substances that cannot permeate the electrolyte membrane are used as the osmotic pressure generating source, the electrolyte membrane functions as a semipermeable membrane. Then, the water produced at the cathodes 16 diffuses back toward the anodes 10. The back diffusion of the produced water can lower the methanol concentration near the anodes 10 (locally), thereby reducing cross over. Moreover, the back diffusion of the water produced at the cathodes 16 precludes any water shortage at the anode and allows continuous power generation even when an aqueous methanol solution (or pure methanol) beyond the stoichiometric ratio (methanol:water=1:1, or a methanol concentration of 64% by weight) is used as the fuel.

The semipermeable membrane 66 may be made of a membrane that has microscopic holes of such dimensions that allow methanol molecules to pass through, but not glucose or other substances contributing to the generation of osmotic pressure, or may be made of a membrane that has an equivalent function (methanol permeability and glucose impermeability). Specifically, suitable materials include: celluloses such as cellophane, regenerated cellophane, and acetate; and synthetic polymers such as polysulfone, polyacrylonitrile, polymethyl methacrylate, ethylene vinyl alcohol copolymer, and polyester polymer alloys. In addition to this, Nafion™ and other ion exchange membranes may also be used as solid polymer membranes as long as they exhibit the properties of semipermeable membranes, as mentioned previously.

Meanwhile, the osmotic pressure generating source to be loaded into the fuel chamber 22 is preferably made of materials that are stable in the operating conditions (environment) of the fuel cell 100, i.e., in the range of −10° C. to 60° C., and are resistant to methanol and acid. The materials preferably cause neither ionization nor electrode reaction so as not to affect the electrolyte membrane 14, and must also have an impermeable property against the semipermeable membrane 66 described above. Further, the osmotic pressure generating source loaded into the fuel chamber 22 needs to be made of materials that are impermeable to the electrolyte membrane 14. At present, glucose is easily available and is thus considered to be an optimum material, though not restrictive.

Figure 4:
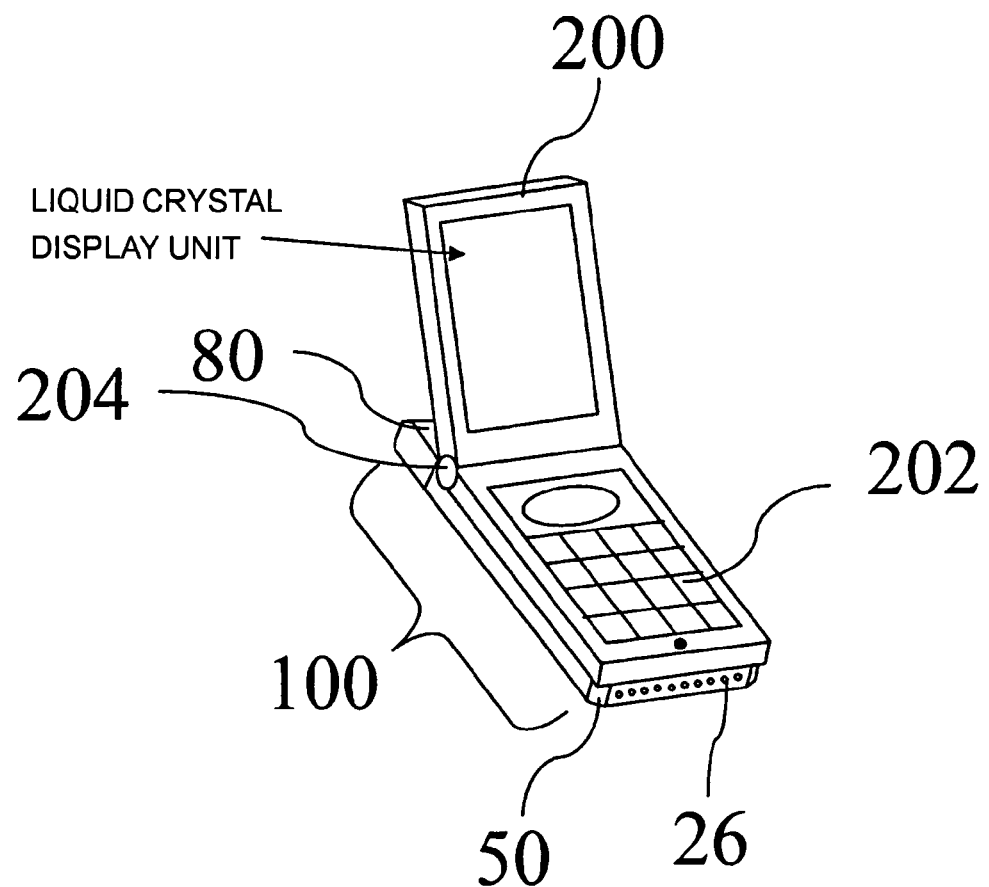
FIG. 4 is a perspective view schematically showing the appearance of a cellular phone which is equipped with the fuel cell according to the embodiment.

A description will now be given in detail, with reference to the drawings, of how the fuel cell 100 of the present embodiment as described above is applied to a cellular phone 200. FIG. 4 is a perspective view schematically showing the appearance of the cellular phone 200 which is equipped with the fuel cell 100. As shown in FIG. 4, the fuel cell 100 is mounted on an operating part 202 of the cellular phone 200, and the cathode-side product discharge holes 28, though not shown, are formed in the surface not in contact with the cellular phone 200 (being the rear surface thereof). The fuel cell 100 is arranged on the operating part 202 of the cellular phone 200 so that the fuel cartridge 80 lies near a hinge part 204 of the cellular phone 200 as shown in FIG. 4. In this position, the fuel cartridge 80 is positioned above the fuel cell body 50 when in use, in situations such as where the power consumption of the cellular phone 200 is higher, such as during calling, emailing, texting or making a video phone call. This makes it possible to supply the methanol fuel from the fuel cartridge 80 to the fuel cell body 50 not only using osmotic pressure but also using gravity, so that with even a small osmotic pressure the methanol fuel (with a small amount of glucose) is supplied to the fuel cell body 50. Conversely, when the anode-side product discharge holes 26 are positioned near the hinge part 204, the supply of the methanol fuel from the fuel cartridge 80 to the fuel cell body 50 relies on the osmotic pressure, whereas carbon dioxide produced by the anodes 10 can be discharged smoothly.

The present invention has dealt with a fuel cell in which a semipermeable membrane is formed in the connecting area between the fuel cell body and the fuel cartridge. However, the present invention is not limited thereto. The semipermeable membrane may also be formed between the fuel chamber and the anodes. Moreover, despite the use of the fuel cartridge which is removable from the fuel cell body, the present invention is also applicable to a fuel cell in which the fuel cartridge is turned into a fuel tank that is fixed to the fuel cell body, and the methanol fuel is refilled into the fuel tank accordingly.

Furthermore, while the cellular phone has been provided as an example of the application for the fuel cell to be mounted on, it should be understood that the fuel cell may also be applied to other various portable devices, including personal computers, PDAs, MP3 players, digital cameras, and electronic dictionaries (books).

What is claimed is:
1. A fuel cell comprising:
an electrolyte layer;
a first electrode which is provided on one surface of the electrolyte layer and to which a liquid fuel is supplied;
a second electrode which is provided on the other surface of the electrolyte layer and to which an oxidant is supplied;
a fuel chamber which is provided next to the first electrode and stores the liquid fuel to be supplied to the first electrode;
a fuel reservoir which is provided next to the fuel chamber and stores the liquid fuel to be refilled into the fuel chamber;
an osmotic pressure generating source which dissolves in a liquid in the fuel chamber; and
a selectively permeable unit which is provided between the fuel chamber and the fuel reservoir and allows the liquid fuel to move from the fuel reservoir to the fuel chamber by means of osmotic pressure generated by the osmotic pressure generating source, the osmotic pressure generating source being impermeable to the selectively permeable unit, wherein
the osmotic pressure generating source remains undissolved when the only liquid stored in the fuel chamber is the liquid fuel,
the fuel chamber is provided with a fuel supply port,
the fuel reservoir is configured to be connected to or disconnected from the fuel supply port, and the selectively permeable unit is provided in a path for supplying the liquid fuel from the fuel reservoir to the fuel chamber, and wherein the selectively permeable membrane unit is made of a material selected from the group consisting of cellulose, polysulfone, polyacrylonitrile, polymethyl methacrylate, ethylene vinyl copolymer, polyester polymer alloys, and sulfonated tetrafluoroethylene based polymer.

2. The fuel cell according to claim 1, wherein the osmotic pressure generating source that remains undissolved is dissolved by produced water that diffuses back from the second electrode.

3. The fuel cell according to claim 1, wherein the fuel reservoir is provided with a hollow insert protrusion, and the insert protrusion is inserted into the fuel supply port of the fuel chamber.

4. The fuel cell according to claim 3, wherein the selectively permeable unit is provided inside the insert protrusion.

5. The fuel cell according to claim 4, wherein the fuel reservoir is provided with a fuel bag, a retaining ring configured to fasten an inlet of the fuel bag to the insert protrusion, and a tab formed on an inner wall of the insert protrusion, and the selectively permeable unit is supported between the retaining ring and the tab.

* * * * *